United States Patent [19]

Hall, Jr.

[11] Patent Number: 5,272,629

[45] Date of Patent: Dec. 21, 1993

[54] METHOD FOR DETERMINING THE SLOWING DOWN LENGTH AND THE POROSITY OF A FORMATION SURROUNDING A BOREHOLE

[75] Inventor: Hugh E. Hall, Jr., Huntsville, Tex.

[73] Assignee: Baker Hughes Incorporated, Houston, Tex.

[21] Appl. No.: 852,786

[22] Filed: Apr. 9, 1992

[51] Int. Cl.$^5$ .............................................. G01V 5/00
[52] U.S. Cl. ..................................... 364/422; 73/153; 73/38; 73/155
[58] Field of Search ..................... 364/422; 73/153, 38, 73/155

[56] References Cited

U.S. PATENT DOCUMENTS

| | | | |
|---|---|---|---|
| 3,567,935 | 3/1971 | Nagel | 250/83.1 |
| 4,605,854 | 8/1986 | Smith, Jr. | 250/266 |
| 4,810,459 | 3/1989 | Fontenot | 376/160 |

Primary Examiner—Roy N. Envall, Jr.
Assistant Examiner—Gita D. Shingala
Attorney, Agent, or Firm—Rosenblatt & Assoc.

[57] ABSTRACT

The present invention relates to the determination of a spatial formation parameter such as slowing down length and porosity in a measurement while drilling ("MWD") tool. The invention, more particularly, relates to the use of a neutron source and multiple neutron detectors in an MWD tool to determine the slowing down length of neutrons in the formation and to derive the formation porosity from the determined slowing down length.

18 Claims, 6 Drawing Sheets

INSERT A NEUTRON EMISSION/DETECTION DEVICE, COMPRISING A FAST NEUTRON SOURCE AND FOUR NEUTRON DETECTORS, EACH OF SAID DETECTORS SPACED A UNIQUE DISTANCE FROM THE NEUTRON SOURCE, INTO A BOREHOLE SURROUNDED BY A FORMATION.

COUNT THE NEUTRONS DETECTED BY EACH OF THE FOUR NEUTRON DETECTORS FOR A TIME PERIOD SUFFICIENT TO PROVIDE STATISTICALLY ACCURATE COUNTING MEASUREMENTS TO OBTAIN FOUR MEASURED NEUTRON POPULATIONS.

USE THE FOUR MEASURED NEUTRON POPULATIONS TO NUMERICALLY SOLVE FOUR SIMULTANEOUS EQUATIONS ON A COMPUTER GOVERNED BY THE RELATIONSHIP:

$$z\, N(z) = A e^{-z/L(F)} + B e^{-z/L(B)}$$

USE THE VALUE OF FORMATION SLOWING DOWN LENGTH OBTAINED FROM A SOLUTION OF THE FOUR SIMULTANEOUS EQUATIONS TO DETERMINE THE FORMATION POROSITY USING PUBLISHED INDUSTRY TABLES THAT CORRELATE POROSITY TO SLOWING DOWN LENGTH FOR A SPECIFIC FORMATION COMPOSITION AND NEUTRON SOURCE.

FIG. 2A

DETERMINE THE DRILLING FLUID SLOWING DOWN LENGTH; USING A NEUTRON LOGGING TOOL IN A TEST PIT CONTAINING DRILLING FLUID OF THE SAME COMPOSITION AS USED IN THE BOREHOLE.

INSERT A NEUTRON EMISSION/DETECTION DEVICE, COMPRISING A FAST NEUTRON SOURCE AND THREE NEUTRON DETECTORS, EACH OF SAID DETECTORS SPACED A UNIQUE DISTANCE THAT IS $\geq$ 20 cm AND $\leq$ 60 cm FROM THE NEUTRON SOURCE INTO A BOREHOLE CONTAINING DRILLING FLUID SURROUNDED BY A FORMATION.

COUNT THE NEUTRONS DETECTED BY EACH OF THE THREE DETECTORS FOR A TIME PERIOD SUFFICIENT TO PROVIDE STATISTICALLY ACCURATE COUNTING MEASUREMENTS TO OBTAIN THREE MEASURED NEUTRON POPULATIONS.

USE THE THREE MEASURED NEUTRON POPULATIONS TO NUMERICALLY SOLVE THREE SIMULTANEOUS EQUATIONS ON A COMPUTER GOVERNED BY THE RELATIONSHIP:

$$z\,N(z) = Ae^{-z/L(F)} + Be^{-z/L(B)}$$

USE THE VALUE OF FORMATION SLOWING DOWN LENGTH OBTAINED FROM A SOLUTION OF THE THREE SIMULTANEOUS EQUATIONS TO DETERMINE THE FORMATION POROSITY USING PUBLISHED INDUSTRY TABLES THAT CORRELATE POROSITY TO SLOWING DOWN LENGTH FOR A SPECIFIC FORMATION COMPOSITION AND NEUTRON SOURCE.

FIG. 2B

```
┌─────────────────────────────────────────────────────────────┐
│   CORRECT N(z) MEASUREMENTS FOR DETECTOR DEADTIME.          │
└─────────────────────────────────────────────────────────────┘
                              │
┌─────────────────────────────────────────────────────────────┐
│   USE THE VALUES OF z AND N(z) FOR THE TWO FARTHEST         │
│   DETECTORS FROM THE SOURCE TO SOLVE THE FOLLOWING          │
│   EQUATION FOR A AND L(F):                                  │
│                                                             │
│              z N(z) = Ae^{-z/L(F)}                          │
└─────────────────────────────────────────────────────────────┘
                              │
┌─────────────────────────────────────────────────────────────┐
│   USE THE VALUES OF z FOR THE TWO NEAREST DETECTORS         │
│   FROM THE SOURCE TO CALCULATE N'(z) USING THE              │
│   RELATIONSHIP:                                             │
│                                                             │
│              N'(z) = (1/z) Ae^{-z/L(F)}                     │
└─────────────────────────────────────────────────────────────┘
                              │
┌─────────────────────────────────────────────────────────────┐
│   CORRECT THE MEASURED NEUTRON POPULATION, N(z),            │
│   MEASURED BY THE TWO NEAREST DETECTORS, FOR THE            │
│   FORMATION COMPONENT, USING THE RELATIONSHIP:              │
│                                                             │
│              N''(z) = N(z) - N'(z)                          │
└─────────────────────────────────────────────────────────────┘
                              │
┌─────────────────────────────────────────────────────────────┐
│   USE THE VALUES OF z AND N''(z) FOR THE TWO NEAREST        │
│   DETECTORS TO SOLVE THE FOLLOWING EQUATION FOR B AND       │
│   L(B):                                                     │
│                                                             │
│              z N''(z) = Be^{-z/L(B)}                        │
└─────────────────────────────────────────────────────────────┘
                              │
┌─────────────────────────────────────────────────────────────┐
│   USE THE CALCULATED VALUES OF A, B, L(F), AND L(B)         │
│   TO OBTAIN FOUR CALCULATED VALUES OF N(z) AND COMPARE      │
│   CALCULATED VALUES TO CORRESPONDING MEASURED               │
│   NEUTRON POPULATIONS, N(z), TO DETERMINE WHETHER THE       │
│   DIFFERENCE BETWEEN THE CORRESPONDING MEASURED AND         │
│   CALCULATED VALUES OF N(z) IS WITHIN AN ACCEPTABLE         │
│   TOLERANCE.                                                │
└─────────────────────────────────────────────────────────────┘
             │                               │
┌──────────────────────────┐    ┌──────────────────────────┐
│  NOT WITHIN TOLERANCE    │    │    WITHIN TOLERANCE      │
└──────────────────────────┘    └──────────────────────────┘
             │                               │
┌──────────────────────────┐    ┌──────────────────────────┐
│         ITERATE          │    │    DETERMINE POROSITY    │
└──────────────────────────┘    └──────────────────────────┘
```

FIG. 3A

```
┌─────────────────────────────────────────────────────┐
│ CORRECT N(z) MEASUREMENTS FOR DETECTOR DEADTIME.    │
└─────────────────────────────────────────────────────┘
                          │
┌─────────────────────────────────────────────────────┐
│ USE THE VALUES OF z AND N(z) FOR THE TWO FARTHEST   │
│ DETECTORS FROM THE SOURCE TO SOLVE THE FOLLOWING    │
│ EQUATION FOR A AND L(F):                            │
│                                                     │
│           $z\, N(z) = A e^{-z/L(F)}$                │
└─────────────────────────────────────────────────────┘
                          │
┌─────────────────────────────────────────────────────┐
│ USE THE VALUES OF z FOR THE TWO NEAREST DETECTORS   │
│ FROM THE SOURCE TO CALCULATE N'(z) USING THE        │
│ RELATIONSHIP:                                       │
│                                                     │
│           $N'(z) = (1/z)\, A e^{-z/L(F)}$           │
└─────────────────────────────────────────────────────┘
                          │
┌─────────────────────────────────────────────────────┐
│ CORRECT THE MEASURED NEUTRON POPULATION, N(z),      │
│ MEASURED BY THE TWO NEAREST DETECTORS, FOR THE      │
│ FORMATION COMPONENT, USING THE RELATIONSHIP:        │
│                                                     │
│           $N''(z) = N(z) - N'(z)$                   │
└─────────────────────────────────────────────────────┘
                          │
┌─────────────────────────────────────────────────────┐
│ USE THE VALUES OF z AND N''(z) FOR THE TWO NEAREST  │
│ DETECTORS TO SOLVE THE FOLLOWING EQUATION FOR B     │
│                                                     │
│           $z\, N''(z) = B e^{-z/L(B)}$              │
└─────────────────────────────────────────────────────┘
                          │
┌─────────────────────────────────────────────────────┐
│ USE THE CALCULATED VALUES OF A, B, L(F), AND L(B)   │
│ TO OBTAIN FOUR CALCULATED VALUES OF N(z) AND COMPARE│
│ CALCULATED VALUES TO CORRESPONDING MEASURED         │
│ NEUTRON POPULATIONS, N(z), TO DETERMINE WHETHER THE │
│ DIFFERENCE BETWEEN THE CORRESPONDING MEASURED AND   │
│ CALCULATED VALUES OF N(z) IS WITHIN AN ACCEPTABLE   │
│ TOLERANCE.                                          │
└─────────────────────────────────────────────────────┘
             │                              │
┌────────────────────────┐      ┌────────────────────────┐
│ NOT WITHIN TOLERANCE   │      │ WITHIN TOLERANCE       │
└────────────────────────┘      └────────────────────────┘
             │                              │
┌────────────────────────┐      ┌────────────────────────┐
│        ITERATE         │      │   DETERMINE POROSITY   │
└────────────────────────┘      └────────────────────────┘
```

FIG. 3B

METHOD FOR DETERMINING THE SLOWING DOWN LENGTH AND THE POROSITY OF A FORMATION SURROUNDING A BOREHOLE

BACKGROUND OF THE INVENTION

1. Field of the Invention

The present invention relates to the determination of a spatial formation parameter such as slowing down length and porosity in a measurement while drilling ("MWD") tool. The invention, more particularly, relates to the use of a neutron source and multiple neutron detectors in an MWD tool to determine the slowing down length of neutrons in the formation and to derive the formation porosity from the determined slowing down length.

2. Description of the Prior Art

Prior art porosity logging tools have used neutron emission/detection devices to measure and/or calculate formation porosity. The presence of hydrogen in a formation is an indicia of formation porosity. Hydrogen is an effective moderator of neutrons. It is well known in the prior art that the degree to which neutrons emitted from a fast or epithermal neutron source are moderated is an indicia of formation porosity. The relationship between hydrogen content, neutron moderation, and porosity is discussed in R. F. Roesler et al., "Theory and Application of an MWD Neutron Porosity Sensor", Society of Petroleum Engineers of AIME, Paper No. 16057, presented at the 1987 SPE/IADC Conference in New Orleans, La.

Drilling fluid is made up substantially of hydrogen and therefore functions as a neutron moderator. It is well known in the prior art that the presence of drilling fluid in the borehole affects the accuracy of neutron logging measurements aimed at determining formation porosity. Since the hydrogen content of drilling fluid in a borehole is usually higher than the hydrogen content of a formation surrounding the borehole, neutron logging measurements made with prior art porosity logging devices provide a higher indication of porosity than is accurate for the formation.

It is well known in the art that environmental parameters such as stand-off, borehole diameter, borehole shape, and drilling fluid salinity affect the accuracy of neutron logging measurements aimed at determining formation porosity. The effects of these parameters are discussed in H. D. Scott et al., "Dual Porosity CNL* Counting Rate Processing", Society of Petroleum Engineers of AIME, Paper No. 11146 (1982). Prior art neutron logging porosity tools have attempted to correct for borehole environmental effects and tool stand-off using ratio techniques and/or crossplot techniques as disclosed in U.S. Pat. No. 4,760,252 to Albats et al.

A problem inherent in prior art porosity logging devices is the presence of errors in the porosity measurements due to the environmental parameters discussed above. Correction techniques employed in the prior art are attempts at compensating for the inaccuracies resulting from environmental effects such as borehole size and stand-off. These corrections or compensation techniques do not entirely eliminate the errors resulting from these environmental effects.

The present invention provides a method for determining the porosity of a formation surrounding a borehole that is independent of borehole size and stand-off. Porosity measurements taken with the method of the present invention are free from the inherent inaccuracies present in the prior art due to environmental effects such as borehole size and stand-off.

SUMMARY OF THE INVENTION

The present invention utilizes known physical relationships between neutron flux and neutron slowing down length to numerically calculate the formation slowing down length and determine the formation porosity from the formation slowing down length.

It is known that the relationship between epithermal neutron flux and slowing down length is governed or defined by the following relationship:

$$z\, \phi(z) = K\, e^{-z/SDL}; \qquad (1)$$

where z is the distance between the neutron source and the point at which neutron flux is measured; $\phi(z)$ is the measured neutron flux; K is a constant proportional to the point neutron source strength and inversely proportional to the epithermal neutron diffusion coefficient; and SDL is the slowing down length of the medium through which the neutrons have traveled.

It is known that the relationship between thermal neutron flux and slowing down length is governed or defined by the following relationship:

$$z\, \phi(z) = \frac{J\,(DL)^2}{(SDL^2 - DL^2)}\, e^{-z/SDL} \qquad (2)$$

where:

$z\, \phi(z)$ and SDL are defined above;

J is a constant proportional to the point neutron source strength and inversely proportional to the thermal neutron diffusion coefficient; and DL is the thermal neutron diffusion length in the medium through which the neutrons have travelled.

The above relationships are described in L. S. Allen et al., "Dual-Spaced Neutron Logging for Porosity", *Geophysics*, Volume 32, pp. 60–68, (1967). This reference is referred to herein as the "Allen reference". When $z\, \phi(z)$ is plotted on a semilogarithmic scale versus z, for boreholes of various diameters, the plots appear to be made up of two components. This is shown in FIG. 1 of the Allen reference. One component is associated with the formation and the other component is associated with the borehole.

There are a number of relationships known in the prior art that define neutron flux as a mathematical function of distance from a point source and some other spatial parameter such as slowing down length, diffusion length or migration area. The present invention uses the known mathematical relationships between neutron flux and distance from a point source to solve a set a simultaneous equations for a related spatial parameter of the formation. In preferred embodiments of the present invention, the related spatial parameter can be correlated to other formation properties, such as formation porosity.

It is known that neutron count rate is proportional to neutron flux. The term "neutron population" refers to the measured neutron count rate over a given time interval. The present invention employs the measurement of neutron population, N(z), as an indication of neutron flux.

The relationship between neutron population and slowing down length, employed in a preferred embodiment of the present invention, is defined by the following equation:

$$z\,N(z) = Ae^{-z/L(F)} + Be^{-z/L(B)} \quad (3)$$

where:
N(z) is the measured neutron population at a detector spaced a distance z from the neutron source;
A is the formation constant at a given depth;
B is the borehole constant at a given depth;
L(F) is the formation slowing down length; and
L(B) is the borehole slowing down length.

In one embodiment of the present invention, a neutron emission/detection device comprising a fast neutron source and four neutron detectors is inserted into a borehole surrounded by a formation. Each of the four detectors is spaced a unique distance from the neutron source. Neutrons are counted at each of the four detectors to obtain four measured neutron populations. These four measured neutron populations provide four values of N(z) for four known and unique values of z. These four measured neutron populations are used to numerically solve four simultaneous equations that relate neutron flux to distance from a point source and some other spatial parameter. In a preferred embodiment, the four simultaneous equations take the form shown in the equation (3). The equations are solved for the four unknowns: A, B, L(B), and L(F).

The value of the formation slowing down length determined by solving the four simultaneous equations can then be used with tables or published industry graphs depicting the relationship between slowing down length and porosity for formations of known compositions and for known neutron source characteristics to obtain the formation porosity. Such graphs appear in J. A. Czubek, "Rock Neutron Parameters—I. Neutron Slowing-Down Parameters", Nuclear Geophysics, Vol. 4, No. 2, at pp. 153-154, (1990); and D. C. McKeon et al., "SNUPAR—A Nuclear Parameter Code for Nuclear Geophysics Applications", Nuclear Geophysics, Vol. 2, No. 4, at p. 218, (1988).

In another embodiment, the slowing down length of the drilling fluid used in the borehole is determined in a test pit using logging techniques well known in the art. This measured slowing down length is taken to be the borehole slowing down length where the drilling fluid used in the test pit is compositionally equivalent to the drilling fluid used in the borehole. Thus, the term L(B) in equation (3) is a known quantity as a result of the test pit measurements.

A neutron emission/detection device comprising a neutron source and three neutron detectors is inserted into the borehole and neutron measurements are taken at each of the three detectors, spaced a unique distance, z, from the neutron source to obtain three values of N(z). These three measured neutron populations are used to numerically solve three simultaneous equations that relate neutron flux to distance from a point source and some other spatial parameter. In a preferred embodiment, these three simultaneous equations take the form shown in equation (3). These simultaneous equations are solved for the three unknowns, A, B, and L(F). The formation slowing down length can then be used, as described above, in conjunction with published industry graphs to obtain the formation porosity.

The present invention can be used with a wide variety of neutron sources, including Californium, Americium-Beryllium or a pulsed neutron source.

BRIEF DESCRIPTION OF THE DRAWINGS

FIG. 2A is a block diagram of the method of practicing the four detector embodiment of the present invention.

FIG. 2B is a block diagram of the method of practicing the three detector embodiment of the present invention.

FIG. 3A is a block diagram of a method of numerically solving the four simultaneous equations of the four detector embodiment of the present invention.

FIG. 3B is a block diagram of a method of numerically solving the three simultaneous equations of the three detector embodiment of the present invention.

DESCRIPTION OF THE PREFERRED EMBODIMENTS

Figure 1B:
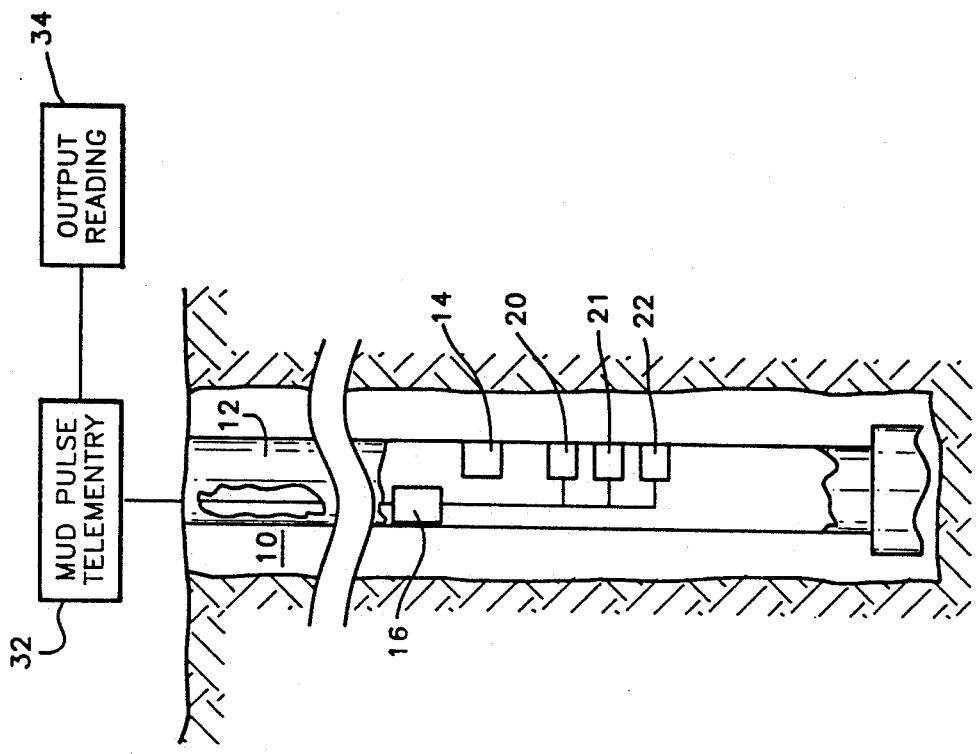
FIG. 1B is a side view of a three detector embodiment of a neutron emission/detection assembly used to practice this invention.
Figure 1A:
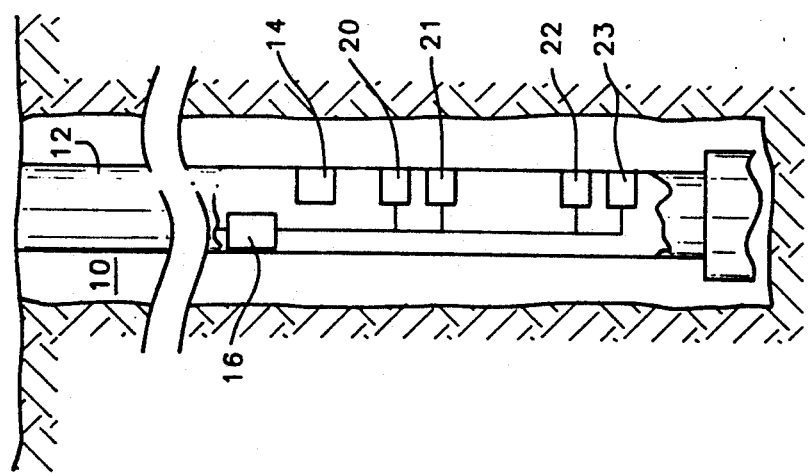
FIG. 1A is a side view of a four detector embodiment of a neutron emission/detection assembly used to practice this invention.

There are two basic embodiments of the present invention, a four detector embodiment, as shown in FIGS. 1A, 2A, and 3A, and a three detector embodiment, as shown in FIGS. 1B, 2B, and 3B. The neutron emission/detection device 12 of the four detector embodiment is depicted in FIG. 1A. This device comprises a neutron source 14 and four neutron detectors 20-23. Each detector is spaced a unique distance, z, from a fast neutron source 14. In a preferred embodiment, neutron source 14 has an energy level less than or equal to 15 MeV.

In a preferred embodiment, the distance between each of the detectors 20-23 and the source 14 is greater than or equal to 20 centimeters and less than or equal to 60 centimeters. In one embodiment, the four detectors 20-23 are equally spaced apart from each other.

The two detectors nearest to source 14 are referred to as the near detectors 20-21. The two detectors farthest from source 14 are referred to as the far detectors 22-23. In one embodiment, the distance separating detectors 21 and 22 is greater than the distance separating each detector in the near detector pair and each detector in the far detector pair.

Referring to FIG. 1A, a neutron emission/detection device of the four detector embodiment 12 is inserted into a borehole 10 surrounded by a formation. Each detector 20-23 counts neutrons for a time period sufficient to provide statistically accurate counting measurements to obtain four measured neutron populations.

Referring to FIG. 2A, the four measured neutron populations, N(z), are used to numerically solve four simultaneous equations governed by the relationship shown in equation (3). These equations can be solved on a computer or other calculation device known in the art.

In a preferred embodiment, the iterative method used to numerically solve the four simultaneous equations is shown in FIG. 3A. First, all measured neutron populations are corrected for detector dead time. Methods of detector dead time correction are disclosed in U.S. Pat. No. 4,424,444 to Smith, Jr. et al., hereinafter referred to as the "'444 patent". Next, the values of z and N(z) for the two far detectors 22-23 are used to solve the following equation for A and L(F):

$$z\, N(z) = Ae^{-z/L(F)} \qquad (4)$$

In a preferred embodiment, equation (4) is solved using a least squares method.

The values of z for the two near detectors 20-21 are used with the value of L(F) obtained from the solution of equation (4) calculate the modified counts, N'(z), using the following relationship:

$$N'(z) = (1/z)\, Ae^{-z/L(F)} \qquad (5)$$

The neutron populations measured at near detectors 20-21 are then corrected for the formation component to obtain the formation component corrected neutron populations, N''(z), using the following relationship:

$$N''(z) = N(z) - N'(z), \qquad (6)$$

The values of z and N''(z) for the near detectors 20-21 are then used to solve the following equation for B and L(B):

$$z\, N''(z) = Be^{-z/L(B)} \qquad (7)$$

In a preferred embodiment, equation (7) is solved using a least square method.

In a preferred embodiment, the calculated values A, B, L(F), and L(B) are substituted back into equation (3), along with the values of z for each of the four detectors 20-23, to obtain four calculated values of N(z). These newly calculated values of N(z) are compared in a least squares sense to the initially measured values of N(z) to determine whether the difference in the least squares sense between the calculated values and the measured values of neutron population is within an acceptable tolerance. If the difference is not within an acceptable tolerance, the preceding numerical technique can be repeated for subsequent iterations until calculated values within acceptable tolerance limits are obtained. Such iterative techniques are disclosed in the '444 patent.

The value of formation slowing down length, L(F), obtained from the numerical solution of equation (3) can then be used to determine the formation porosity using published industry tables that correlate porosity to slowing down length for a specific formation composition and neutron source. This same step is performed when practicing this invention with the three detector embodiment, described below.

Figure 1D:
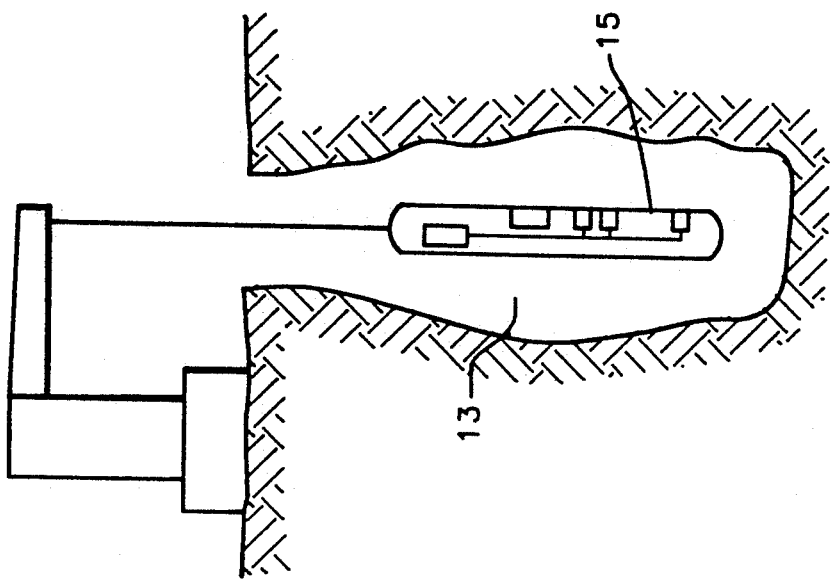
FIG. 1D is an isometric view of a porosity logging tool in a test pit used to determine drilling fluid slowing down length.

In the three detector embodiment of the present invention, as shown in FIG. 2B, the slowing down length of the drilling fluid is first determined. In a preferred embodiment, this determination is accomplished using a neutron logging tool 15 in a test pit 11 containing drilling fluid 13 of the same composition as used in actual oilfield boreholes, as shown in FIG. 1D. The determination of the drilling fluid slowing down length provides a value to be used for the borehole slowing down length, L(B), in equation (3).

Referring to FIG. 1B, a neutron emission/detection device of the three detector embodiment 12 is inserted into a borehole 10 surrounded by a formation. Each detector 20-22 counts neutrons for a time period sufficient to provide statistically accurate counting measurements to obtain three measured neutron populations.

Referring to FIGS. 2B and 3B, the three measured neutron populations, N(z), are corrected for detector dead time. The dead time corrected neutron populations are then used to numerically solve three simultaneous equations governed by the relationship shown in equation (3). These equations can be solved on a computer or other calculation device known in the art. Such a computer is depicted as signal processing circuitry 18 in FIG. 1C.

In one embodiment of the present invention, the numerical solution of equation (3) is performed on a computer located downhole. The value of the formation slowing down length, L(F), obtained from the solution of equation (3) is transmitted to the surface by way of a mud pulse telemetry system 32, as shown in FIG. 1B, where it is provided as an output reading 34. The value of the formation slowing down length is then taken from output reading 34 and correlated to formation porosity using tables at the surface.

In a preferred embodiment, the method used to numerically solve the four simultaneous equations is shown in FIG. 3B. After being corrected for detector dead time, the values of z and N(z) for the two far detectors 20-22 are used to solve equation (4) for A and L(F). In a preferred embodiment, equation (4) is solved using a least squares method.

The value of z for the near detector 20 is used with the value of L(F) obtained from the solution of equation (4) to calculate the modified counts, N'(z), using equation (5).

The neutron population measured at near detector 20 is then corrected for the formation component to obtain the corrected counts, N''(z), using equation (6).

The values of z and N''(z) for the near detector 20 are then used to solve equation (7) for B where L(B) was determined by measuring the drilling fluid slowing down length in a test pit. In a preferred embodiment, equation (7) is solved using a least squares method.

In a preferred embodiment, the calculated values of A, B, and L(F) are substituted back into equation (3), along with the values of z for each of the three detectors 20-22 to calculate new values of N(z). These newly calculated values of N(z) are compared in a least squares sense to the initially measured values of N(z) to determine whether the difference between the calculated values and the measured values of neutron population is within an acceptable tolerance. If the difference in the least squares sense is not within an acceptable tolerance, the preceding numerical techniques can be repeated for subsequent iterations until calculated values within acceptable tolerance limits are obtained.

Figure 1C:
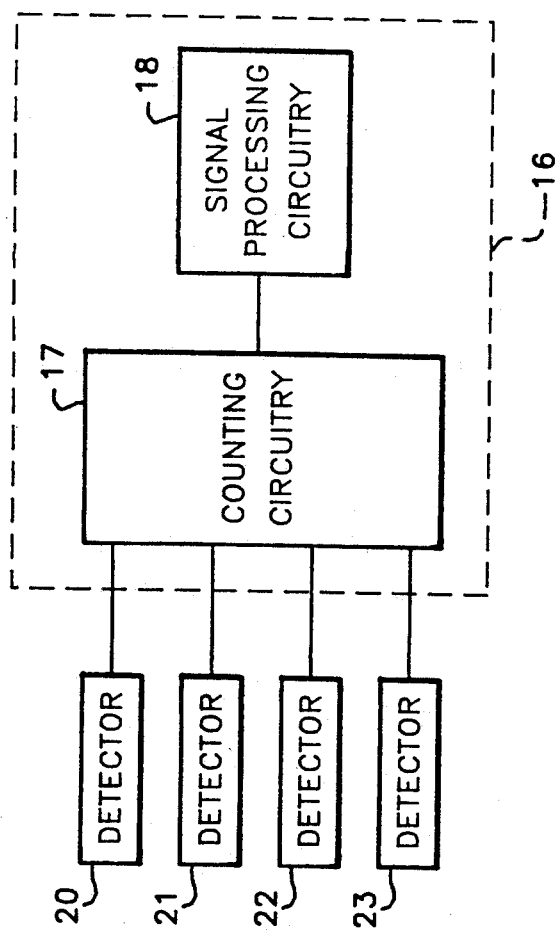
FIG. 1C is a schematic block diagram of the counting and signal processing circuitry used in practicing the present invention.

A schematic block diagram of the counting and signal processing circuitry used in practicing the present invention is shown in FIG. 1C. The neutron detectors 20-23 provide or transmit input signals proportional to neutron counts to counting circuitry 17. Counting circuitry 17 is segregated into addressable and retrievable memory units for each detector providing input into counting circuitry 17. Counting circuitry 17 provides or transmits input signals into signal processing circuitry 18. Signal processing circuitry 18 comprises programmable electronic devices capable of performing the numerical analysis of equation (3) using the method disclosed herein. Counting circuitry 17 and signal processing circuitry 18 are capable of storing the data that is input into them.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

What is claimed is:

1. A method for determining the porosity of a formation surrounding a borehole comprising the steps of:
   (a) inserting a neutron emission/detection device into a borehole surrounded by a formation, said device comprising a fast neutron source, and four neutron detectors, each of said detectors spaced a unique distance from said neutron source;
   (b) transmitting a signal from each of the four neutron detectors to counting circuitry, said signals being proportional to the neutrons counted by each detector;
   (c) receiving an input signal in the counting circuitry from the four neutron detectors and counting the neutrons detected by each of the four detectors for a time period sufficient to provide statistically accurate counting measurements to obtain four measured neutron populations and transmitting an input signal to signal processing circuitry;
   (d) processing the input signal from the counting circuitry in the signal processing circuitry by using the four measured neutron populations from step (c) to numerically solve four simultaneous equations on a computer governed by the relationship:

$$z N(z) = A e^{-z/L(F)} + B e^{-z/L(B)}$$

where:
   $N(z)$ is the measured neutron population at a detector spaced a distance z from the neutron source;
   A is the formation constant at a given depth;
   B is the borehole constant at a given depth;
   $L(B)$ is the borehole slowing down length; and
   $L(F)$ is the formation slowing down length; and
   (e) using the value of formation slowing down length obtained from a solution of the four simultaneous equations in step (d) to determine the formation porosity using tables that correlate porosity to slowing down length for a specific formation composition and neutron source.

2. The method of claim 1 wherein the distance between each of the detectors and the source is greater than or equal to 20 centimeters and less than or equal to 60 centimeters.

3. The method of claim 1 wherein the energy level of the fast neutron source is less than or equal to 15 MeV.

4. The method of claim 1 wherein the four simultaneous equations are numerically solved using the following method:
   (a) correct measured values of $N(z)$ for detector dead time;
   (b) using the values of z and the dead time corrected $N(z)$ for the two farthest detectors from the source to solve the following equation for A and $L(F)$:

$$z N(z) = A e^{-z/L(F)};$$

(c) using the values of z for the two nearest detectors from the source to calculate $N'(z)$ using the relationship: $N'(z) = (1/z) A e^{-z/L(F)}$;
   (d) correcting the measured dead time corrected neutron population, $N(z)$, measured by the two nearest detectors, for the formation component, using the relationship: $N''(z) = N(z) - N'(z)$, wherein $N''(z)$ is the formation component corrected neutron population;
   (e) using the values of z and $N''(z)$ for the two nearest detectors to solve the following equation for B and $L(B)$: $z N''(z) = B e^{-z/L(B)}$; and
   (f) using the calculated values of A, B, $L(F)$, and $L(B)$ obtained from steps (b) and (e) to obtain four calculated values of $N(z)$ for the value of z corresponding to each detector using the relationship defined in claim 1, and comparing in a least squares sense each newly calculated value of $N(z)$ to the corresponding measured neutron populations, $N(z)$, to determine whether the difference in the least squares sense between the corresponding measured and calculated values of $N(z)$ is within an acceptable tolerance.

5. The method of claim 2 wherein said four neutron detectors are arranged as a pair of near detectors and a pair of far detectors wherein the distance separating the two pairs of detectors is greater than the distance separating the detectors in each of said pairs.

6. A method for determining the porosity of a formation surrounding a borehole containing drilling fluid comprising the steps of:
   (a) determining the drilling fluid slowing down length;
   (b) inserting a neutron emission/detection device into a borehole containing drilling fluid surrounded by a formation, said device comprising a fast neutron source, and three neutron detectors, each of said detectors spaced a unique distance from said neutron source;
   (c) counting the neutrons detected by each of the three detectors in counting circuitry for a time period sufficient to provide statistically accurate counting measurements to obtain three measured neutron populations and transmitting an input signal to signal processing circuitry;
   (d) processing the input signal from the counting circuitry in the signal processing circuitry by using the three measured neutron populations from step (c) to numerically solve three simultaneous equations on a computer governed by the relationship:

$$z N(z) = A e^{-z/L(F)} + B e^{-z/L(B)}$$

where:
   $N(z)$ is the measured neutron population at a detector spaced a distance z from the neutron source;
   A is the formation constant at a given depth;
   B is the borehole constant at a given depth;
   $L(B)$ is the slowing down length of drilling fluid used in the borehole, as determined in step (a); and
   $L(F)$ is the formation slowing down length; and
   (e) using the value of formation slowing down length obtained from a solution of the three simultaneous equations in step (d) to determine the formation porosity using tables that correlate porosity to slowing down length for a specific formation composition and neutron source.

7. The method of claim 6 wherein the distance between each of said detectors and said source is greater than or equal to 20 centimeters and less than or equal to 60 centimeters.

8. The method of claim 6 wherein the energy level of said fast neutron source is less than or equal to 15 MeV.

9. The method of claim 6 wherein the three simultaneous equations are numerically solved using the following method:
   (a) correct measured neutron values N(z) for detector dead time;
   (b) using the values of z and the dead time corrected N(z) for the two farthest detectors from the source to solve the following equation for A and L(F):

$$z\, N(z) = Ae^{-z/L(F)};$$

(c) using the values of z for the nearest detector from the source to calculate N'(z) using the relationship:

$N'(z)$ is equal to $N'(z) = (1/z)\, Ae^{-z/L(F)};$ (d) correcting the measured dead time corrected neutron population, N(z), measured by the nearest detector for the formation component, using the relationship: $N''(z) = N(z) - N'(z)$, wherein $N''(z)$ is the formation component corrected neutron population;
   (e) using the values of z and N''(z) for the nearest detector to solve the following equation for B:

$$Z\, N''(z) = Be^{-z/L(B)};\ \text{and}$$

(f) using the calculated values of A, B, L(F), and L(B) obtained from steps (a) and (e) to obtain three calculated values of N(z) for the value of z corresponding to each detector using the relationship defined in claim 7, and comparing in a least squares sense each newly calculated value of N(z) to the corresponding measured neutron populations, N(z), to determine whether the difference in the least squares sense between the corresponding measured and calculated values of N(z) is within an acceptable tolerance.

10. The method of claim 6 wherein the determination of drilling fluid slowing down length is accomplished using a neutron logging tool in a test pit containing drilling fluid of the same composition as used in actual oilfield boreholes.

11. A method for determining the porosity of a formation surrounding a borehole containing drilling fluid comprising the steps of:
   (a) determining the slowing down length of drilling fluid contained within the borehole by using a neutron logging tool in a test pit containing drilling fluid of the same composition as used in the borehole;
   (b) inserting a neutron emission/detection device into a borehole containing drilling fluid surrounded by a formation, said device comprising a neutron source, and three neutron detectors, each of said detectors based a unique distance that is greater than or equal to 20 centimeters and less than or equal to 60 centimeters from said neutron source;
   (c) counting the neutrons detected by each of the three detectors for a time period sufficient to provide statistically accurate counting measurements to obtain three measured neutron populations;
   (d) using the three measured neutron populations from step (b) to numerically solve three simultaneous equations using an iterative least squares technique on a computing device located downhole defined by the relationship:

$$z\, N(z) = Ae^{-z/L(F)} + Be^{-z/L(B)}$$

where:
   N(z) is the measured neutron population at a detector spaced a distance z from the neutron source;
   A is the formation constant at a given depth;
   B is the borehole constant at a given depth;
   L(B) is the slowing down length of drilling fluid used in the borehole, as determined in step (a); and
   L(F) is the formation slowing down length;
   (e) transmitting the value of L(F) obtained from step (d) to the surface by way of a mud pulse telemetry system; and
   (f) using the value of formation slowing down length obtained from a solution of the three simultaneous equations in step (d) to determine the formation porosity using published industry tables that correlate porosity to slowing down length for a specific formation composition and neutron source.

12. A method for determining the slowing down length of a formation surrounding a borehole comprising the steps of:
   (a) inserting a neutron emission/detection device into a borehole surrounded by a formation, said device comprising a fast neutron source, and four neutron detectors, each of said detectors spaced a unique distance from said neutron source;
   (b) counting the neutrons detected by each of the four detectors for a time period sufficient to provide statistically accurate counting measurements to obtain four measured neutron populations; and
   (c) using the four measured neutron populations from step (b) to numerically solve four simultaneous equations on a computer governed by the relationship:

$$z\, N(z) = Ae^{-z/L(F)} + Be^{-z/L(B)}$$

where:
   N(z) is the measured neutron population at a detector spaced a distance z from the neutron source;
   A is the formation constant at a given depth;
   B is the borehole constant at a given depth;
   L(B) is the borehole slowing down length; and
   L(F) is the formation slowing down length.

13. The method of claim 12 wherein the distance between each of the detectors and the source is greater than or equal to 20 centimeters and less than or equal to 60 centimeters and the energy level of the source is less than or equal to 15 MeV.

14. A method for determining the slowing down length of a formation surrounding a borehole containing drilling fluid comprising the steps of:
   (a) determining the drilling fluid slowing down length;
   (b) inserting a neutron emission/detection device into a borehole containing drilling fluid surrounded by a formation, said device comprising a fast neutron source, and three neutron detectors, each of said detectors spaced a unique distance from said neutron source;

(c) counting the neutrons detected by each of the three detectors for a time period sufficient to provide statistically accurate counting measurements to obtain three measured neutron populations; and (d) using the three measured neutron populations from step (c) to numerically solve three simultaneous equations on a computer governed by the relationship:

$$z\, N(z) = A e^{-z/L(F)} + B e^{-z/L(B)}$$

where:

N(z) is the measured neutron population at a detector spaced a distance z from the neutron source;
A is the formation constant at a given depth;
B is the borehole constant at a given depth;
L(B) is the slowing down length of drilling fluid used in the borehole, as determined in step (a); and
L(F) is the formation slowing down length.

15. The method of claim 14 wherein the determination of drilling fluid slowing down length is accomplished using a neutron logging tool in a test pit containing drilling fluid of the same composition as used in actual oilfield boreholes.

16. A method for determining a spatial parameter of a formation surrounding a borehole comprising the steps of:

(a) inserting a neutron emission/detection device into a borehole surrounded by a formation, said device comprising a fast neutron source, and four neutron detectors, each of said detectors spaced a unique distance from said neutron source;

(b) counting the neutrons detected by each of the four detectors for a time period sufficient to provide statistically accurate counting measurements to obtain four measured neutron populations; and (c) using the four measured neutron populations from step (b) to numerically solve four simultaneous equations that relate neutron flux to distance from said neutron source and a spatial parameter of the formation to determine the spatial parameter of the formation.

17. The method of claim 16 wherein the spatial parameter of the formation is slowing down length.

18. The method of claim 17, further comprising step of correlating the formation slowing down length to formation porosity using tables known in the logging arts that correlate porosity to slowing down length for a specific formation composition and neutron source.

* * * * *